US010647204B2

(12) United States Patent
Mizuta

(10) Patent No.: US 10,647,204 B2
(45) Date of Patent: May 12, 2020

(54) ELECTRIC ENERGY MANAGEMENT SYSTEM, MANAGEMENT DEVICE FOR ENERGY STORAGE DEVICE, ENERGY STORAGE APPARATUS AND ELECTRIC ENERGY MANAGEMENT METHOD FOR VEHICLE

(71) Applicant: GS Yuasa International Ltd., Kyoto-shi (JP)

(72) Inventor: Yoshihiko Mizuta, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 442 days.

(21) Appl. No.: 15/495,547

(22) Filed: Apr. 24, 2017

(65) Prior Publication Data

US 2017/0310150 A1    Oct. 26, 2017

(30) Foreign Application Priority Data

Apr. 26, 2016    (JP) .................................. 2016-087800

(51) Int. Cl.
*B60L 3/04*    (2006.01)
*B60L 3/00*    (2019.01)
(Continued)

(52) U.S. Cl.
CPC .............. *B60L 3/04* (2013.01); *B60L 3/0046* (2013.01); *B60L 50/16* (2019.02); *H02J 7/0031* (2013.01);
(Continued)

(58) Field of Classification Search
CPC .......... B60L 50/60–50/66; B60L 58/10–58/27; B60R 16/03–16/033; H02J 7/14–7/30
See application file for complete search history.

(56) References Cited

U.S. PATENT DOCUMENTS

2002/0113441 A1    8/2002    Obayashi
2007/0247106 A1    10/2007    Kawahara et al.
(Continued)

FOREIGN PATENT DOCUMENTS

JP    2002-199505 A    7/2002
JP    2007-282375 A    10/2007
(Continued)

*Primary Examiner* — Rexford N Barnie
*Assistant Examiner* — David A Shiao
(74) *Attorney, Agent, or Firm* — McGinn I.P. Law Group, PLLC.

(57) ABSTRACT

An electric energy management system includes: an energy storage device; a generator connected to the energy storage device; a load which is connected to the energy storage device and to the generator and is operated with a supply of an electric energy from the energy storage device and the generator; an electric energy control part configured to control the supply of electric energy to the load from the generator; a detection part configured to detect an abnormal state of the energy storage device; a current cutoff part configured to cut off an electric current between the energy storage device and the load; and a control part configured to issue an advance notice to cut off the electric current to the electric energy control part after the abnormal state is detected by the detection part and before the electric current is cut off by the current cutoff part. The electric energy control part is configured to control the supply of electric energy to the load from the generator based on the advance notice.

17 Claims, 9 Drawing Sheets

(51) Int. Cl.
- *H02J 7/00* (2006.01)
- *H02J 7/14* (2006.01)
- *B60L 50/16* (2019.01)
- *B60L 58/14* (2019.01)
- *B60L 58/24* (2019.01)
- *B60L 50/61* (2019.01)

(52) U.S. Cl.
CPC .............. *H02J 7/0047* (2013.01); *H02J 7/14* (2013.01); *B60L 50/61* (2019.02); *B60L 58/14* (2019.02); *B60L 58/24* (2019.02); *B60L 2240/441* (2013.01); *B60L 2240/545* (2013.01); *B60L 2240/547* (2013.01); *B60L 2240/549* (2013.01); *B60L 2250/10* (2013.01); *H02J 7/00302* (2020.01); *H02J 7/00306* (2020.01); *Y02T 10/705* (2013.01); *Y02T 10/7005* (2013.01); *Y02T 10/7077* (2013.01)

(56) References Cited

U.S. PATENT DOCUMENTS

| | | | |
|---|---|---|---|
| 2010/0087976 A1* | 4/2010 | Aridome | B60L 50/64 701/22 |
| 2010/0109437 A1* | 5/2010 | Fattic | B60K 6/48 307/47 |
| 2010/0110594 A1* | 5/2010 | Walters | B60K 6/46 361/52 |
| 2012/0010771 A1* | 1/2012 | Kato | B60L 58/12 701/22 |
| 2012/0016547 A1* | 1/2012 | Aridome | B60L 58/21 701/22 |
| 2012/0104845 A1* | 5/2012 | Pushkolli | B60L 3/003 307/10.1 |
| 2013/0249496 A1 | 9/2013 | Ju et al. | |
| 2015/0321657 A1* | 11/2015 | Lasson | B60L 58/26 701/22 |
| 2016/0043583 A1* | 2/2016 | Yoshida | H02J 7/0026 320/112 |
| 2017/0144553 A1* | 5/2017 | Steele | B60L 58/20 |

FOREIGN PATENT DOCUMENTS

| | | |
|---|---|---|
| JP | 2012-105504 A | 5/2012 |
| JP | 2013-195183 A | 9/2013 |
| JP | 2013-201888 A | 10/2013 |
| JP | 2014-227035 A | 12/2014 |
| JP | 2015-076959 A | 4/2015 |
| JP | 2015-089160 A | 5/2015 |
| JP | 2015-524362 A | 8/2015 |
| JP | 2016-023979 A | 2/2016 |
| WO | WO 2014/141809 A1 | 9/2014 |

\* cited by examiner

ELECTRIC ENERGY MANAGEMENT SYSTEM, MANAGEMENT DEVICE FOR ENERGY STORAGE DEVICE, ENERGY STORAGE APPARATUS AND ELECTRIC ENERGY MANAGEMENT METHOD FOR VEHICLE

CROSS-REFERENCE TO RELATED APPLICATIONS

This application claims the benefit of Japanese patent application No. 2016-087800 filed on Apr. 26, 2016 which is incorporated by reference.

FIELD

The technique disclosed in this specification relates to an electric energy management system, a management device for an energy storage device, an energy storage apparatus, and an electric energy management method for a vehicle.

BACKGROUND

A battery pack mounted on a vehicle supplies electric energy to various loads such as an engine starter, and electric energy is supplied (charged) to the battery pack from a vehicle generator (alternator). There has been known a battery pack which mounts a battery management device and a current cutoff device therein. The battery management device manages a secondary battery formed of energy storage devices, and the current cutoff device cuts off an electric current supplied to the secondary battery. When the battery management device detects abnormality in the secondary battery, the supply of an electric current to the secondary battery is cut off by the current cutoff device. See JP 2013-195183 A.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the above-mentioned battery pack, when the battery management device detects abnormality in the secondary battery (energy storage device), the battery management device instructs the current cutoff device to cut off the supply of an electric current to the secondary battery for protecting the secondary battery. Accordingly, the supply of electric energy to a load is performed only by the vehicle generator.

When an electric energy consumption amount of the load exceeds an electric energy generation amount of the vehicle generator, an electric energy generation voltage is lowered so that an important load necessary for traveling of a vehicle, safety and the like may not be operated in a stable manner.

This specification discloses a technique for protecting an energy storage device while preventing an operation of a load from becoming unstable.

An electric energy management system according to an aspect of the present invention includes: an energy storage device; a generator connected to the energy storage device; a load connected to the energy storage device and also to the generator and is operated with a supply of an electric energy from the energy storage device and the generator, an electric energy control part configured to control the supply of electric energy to the load from the generator; a detection part configured to detect an abnormal state of the energy storage device; a current cutoff part configured to cut off an electric current between the energy storage device and the load; and a control part configured to issue an advance notice to cut off the electric current to the electric energy control part after the abnormal state is detected by the detection part and before the electric current is cut off by the current cutoff part. The electric energy control part is configured to control the supply of electric energy to the load from the generator based on the advance notice.

A management device for an energy storage device according to another aspect of the present invention includes: a detection part configured to detect an abnormal state of the energy storage device; and a control part configured to switches an electric current which flows between the energy storage device and a load connected to the energy storage device into a cutoff state when the abnormal state is detected by the detection part. The control part is configured to make an advance notice to cut off the electric current to an electric energy control part which controls the supply of electric energy to the load after the abnormal state is detected by the detection part and before the electric current is switched into the cutoff state.

An electric energy management method for a vehicle according to still another aspect of the present invention is a method in which an electric current which flows between a load mounted on the vehicle and an energy storage device is cut off when an abnormal state of the energy storage device is detected. The electric energy management method for a vehicle includes: an advance notice step in which an advance notice to cut off the electric current is issued after the abnormal state is detected and before the electric current is cut off and an electric energy control step in which the supply of electric energy to the load from a generator mounted on the vehicle is controlled based on the advance notice.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Overall Configuration of this Embodiment

Figure 1:
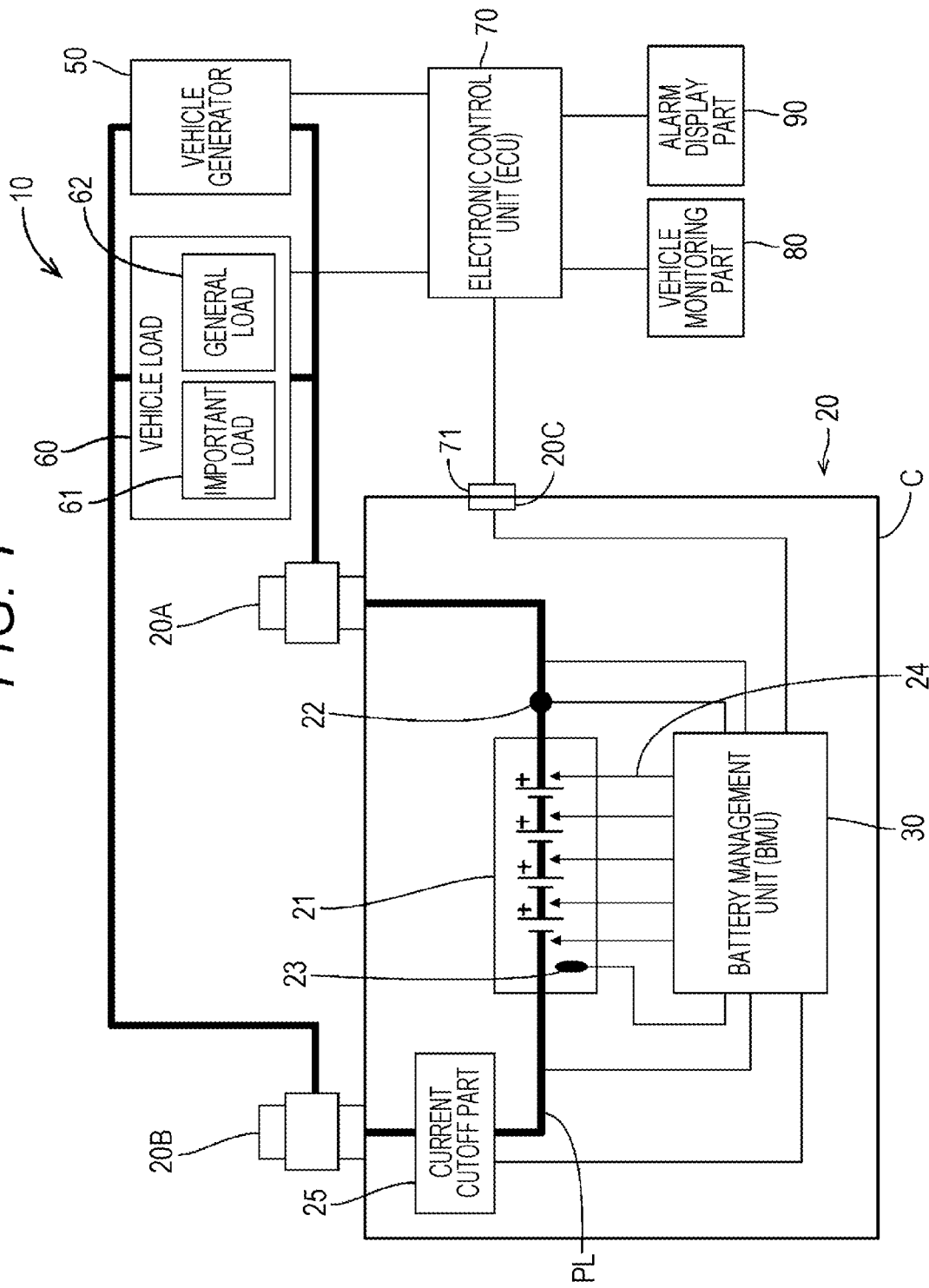
FIG. 1 is a block diagram showing an electric energy management system according to an embodiment 1.

An electric energy management system according to an aspect of this embodiment includes: an energy storage device; a generator connected to the energy storage device; a load connected to the energy storage device and also to the generator and is operated with the supply of an electric energy from the energy storage device and the generator, an electric energy control part configured to control the supply of electric energy to the load from the generator; a detection part configured to detect an abnormal state of the energy storage device; a current cutoff part configured to cut off an electric current between the energy storage device and the load; and a control part configured to issue an advance notice to cut off the electric current to the electric energy control part after the abnormal state is detected by the detection part and before the electric current is cut off by the current cutoff part. The electric energy control part is configured to control the supply of electric energy to the load from the generator based on the advance notice. The advance notice may be referred to "pre-notice (pre-warning)".

Thus, it is possible to protect the energy storage device by cutting off an electric current while preventing an operation of the load from becoming unstable.

A management device for an energy storage device according to another aspect of this embodiment includes: a detection part configured to detect an abnormal state of the energy storage device; and a control part configured to switches an electric current which flows between the energy storage device and a load connected to the energy storage device into a cutoff state when the abnormal state is detected by the detection part. The control part is configured to issue an advance notice to cut off the electric current to an electric energy control part which controls the supply of electric energy to the load after the abnormal state is detected by the detection part and before the electric current is switched into the cutoff state.

An energy storage apparatus according to another aspect of this embodiment is mounted on a vehicle and includes: an energy storage device; the energy storage device management device for the energy storage device; and a current cutoff part configured to cut off an electric current which flows between the energy storage device and the load. The control part is configured to switch the electric current into a cutoff state by the current cutoff part.

An electric energy management method for a vehicle according to another aspect of this embodiment is a method in which an electric current which flows between a load mounted on the vehicle and the energy storage device is cut off when an abnormal state of the energy storage device is detected. The method includes the steps of an advance notice step in which an advance notice to cut off the electric current is issued after the abnormal state is detected and before the electric current is cut off; and an electric energy control step in which the supply of electric energy to the load from a generator mounted on the vehicle is controlled based on the advance notice.

With such configurations, an electric current is switched into a cutoff state by the control part so that the control part issues advance notice to the electric energy control part before the energy storage device is separated from the load. By receiving the advance notice, the electric energy control part can continuously operate the generator so that an electric energy generation amount necessary for a load can be ensured or electric energy to a load having low priority can be limited. Thereafter, the electric energy control part can cut off an electric current between the energy storage device and the load. With such processing, it is possible to protect the energy storage device by cutting off an electric current while preventing an operation of an important load from becoming unstable.

The electric energy management system disclosed in this specification may have the following configurations.

According to still another aspect of this embodiment, the control part may be configured to issue the advance notice plural times corresponding to a level of the abnormal state detected by the detection part.

With such a configuration, the advance notice is issued plural times from an initial level of the abnormal state. For example, first-time advance notice is issued firstly in a stage where the abnormal state is detected or in a state where a level of the abnormal state is low, and advance notice is issued again when the level of the abnormal state rises. Accordingly, in the electric energy control part, the preparation of an electric energy control such as the increase of an electric energy generation amount by a generator or the restriction on the supply of electric energy to a load having low priority can be performed in a stepwise manner corresponding to a level of the abnormal state (the number of times of advance notices).

According to still another aspect of this embodiment, the control part may be configured to issue the advance notice plural times at a predetermined time interval to the electric energy control part when the abnormal state is detected by the detection part.

With such a configuration, count down is started until an electric current is cut off when the advance notice is issued. Accordingly, in the electric energy control part, the preparation of an electric energy control such as the increase of an operation rate of a generator or the restriction on the supply of electric energy to a load having low priority can be performed in a stepwise manner corresponding to the number of times of advance notice.

According to still another aspect of this embodiment, the electric energy control part may be configured to control the supply of electric energy to the load in a stepwise manner each time the advance notice is detected.

With such a configuration, the preparation of an electric energy control can be advanced in a stepwise manner so that the concentration of loads on a vehicle side can be prevented.

According to still another aspect of this embodiment, the control part may be configured to issue a cancellation notification for cancelling cutoff of the electric current to the electric energy control part when elimination of the abnormal state is detected by the detection part after the advance notice is issued, and the electric energy control part may be configured to cancel the control of the supply of electric energy performed based on the advance notice in response to the cancellation notification.

With such a configuration, when the elimination of the abnormal state of the energy storage device is detected by the detection part, the control part issues the cancellation notification to the electric energy control part so that the control performed based on the advance notice is cancelled by the electric energy control part. That is, when the advance notice to cut off an electric current has been issued but the abnormal state of the energy storage device is eliminated, the electric energy management system can be readily restored into a normal state.

According to the still another aspect of this embodiment, the electric energy management system may be mounted on a vehicle and may include a vehicle monitoring part configured to monitor a traveling state of the vehicle. The control part may be configured to decide a time interval between a timing when an electric current is cut off and a timing when the advance notice is issued corresponding to the traveling state of the vehicle detected by the vehicle monitoring part.

For example, when a vehicle cannot stop suddenly depending on a traveling state of the vehicle, an operation of a load may become unstable. With the above-mentioned configuration, by setting a time interval between a timing that an electric current is cut off and a timing that the advance notice is issued shorter thus issuing the advance notice earlier in response to a traveling state of the vehicle, a driver can cope with such a situation with tolerance. Further, the electric energy control part can also perform an electric energy control with tolerance.

According to still another aspect of this embodiment, the electric energy management system may be mounted on a vehicle and may be an electronic control device mounted in the vehicle. The vehicle may include an alarm issuing part configured to issue an alarm, and the electronic control device may cause the alarm issuing part to issue an alarm in response to the advance notice from the control part.

With such a configuration, when the advance notice is transmitted to the electronic control device and the control of the load is performed, the alarm issuing part issues an alarm in a control of a load thus inviting attention of a user of a vehicle.

According to still another aspect of this embodiment, the electric energy management system may be mounted on a vehicle, and the generator may be a vehicle generator which is operated along with driving of an engine of the vehicle. The electronic control part may be configured to inhibit, when the advance notice is issued, idling stop where idling of the engine is temporarily stopped.

With such a configuration, it is possible to prevent that, during idling stop, the load stops due to the stop of the electric energy supply from the generator and the energy storage device. That is, an electric energy generation amount to the load is ensured by the generator and hence, it is possible to prevent an operation of the load from becoming unstable even when an electric current which flows between the load and the energy storage device is cut off.

According to still another aspect of this embodiment, the electric energy management system may be mounted on a vehicle, and the generator may be a vehicle generator which is operated along with driving of an engine of the vehicle. The electric energy control part may be configured to increase an electric energy generation amount of the vehicle generator by increasing a field current of the vehicle generator or by increasing a drive rotational speed of the engine when the advance notice is issued.

With such a configuration, electric energy can be supplied to the load in such a manner that the electric energy control part increases an electric energy generation amount by increasing a field current of the vehicle generator thus increasing an electric energy generation voltage or the electric energy control part increases an electric energy generation amount of the vehicle generator by increasing a drive rotational speed of the engine. Accordingly, it is possible to prevent that an operation of a load to which electric energy is supplied from the energy storage device becomes unstable.

According to still another aspect of this embodiment, the electric energy control part may be configured to increase an electric energy generation amount by increasing a field current of the vehicle generator thus increasing an electric energy generation voltage.

With such a configuration, an electric energy generation amount can be easily increased by a generator without increasing a drive rotational speed of the engine of the vehicle.

According to still another aspect of this embodiment, the electric energy control part may be configured to increase an electric energy generation amount of the vehicle generator by increasing a drive rotational speed of the engine.

With such a configuration, an electric energy generation amount of the generator can be increased by increasing a drive rotational speed of the engine and hence, the electric energy generation amount can be largely increased. Accordingly, it is possible to prevent an operation of a load from becoming unstable even when an electric current which flows between the load and the energy storage device is cut off.

According to still another aspect of this embodiment, the electric energy management system may be mounted on a vehicle. The load may be classified into an important load having a higher degree of importance relevant to traveling of the vehicle and safety of the vehicle and a general load having a lower degree of importance irrelevant to the traveling of the vehicle or the safety of the vehicle. The electric energy control part may reduce or may stop the supply of electric energy to the general load when the advance notice is issued.

In general, a load of the vehicle is classified into an important load of a drive system such as an engine or brake relevant to traveling of the vehicle and an important load relevant to safety of the vehicle, and a general load of a non-drive system such as a heater and an electrically operated open/close door irrelevant to traveling of the vehicle and safety of the vehicle. With such a configuration, by reducing or stopping the supply of electric energy to a general load, it is possible to ensure electric energy supplied to the important load of the drive system. Accordingly, it is possible to prevent an operation of the important load from becoming unstable.

According to still another aspect of this embodiment, the electric energy management system may be mounted on a vehicle, the electric energy control part may be an electronic control device mounted on the vehicle, and the generator may be a vehicle generator which is operated along with driving of an engine of the vehicle. The control part may be configured to issue the advance notice to the electric energy control part plural times at a predetermined time interval when the abnormal state is detected by the detection part. The electronic control device may be configured to sequentially increase controls each time the plurality of advance notices are detected in order of an idling stop inhibition control, a control for increasing an electric energy generation amount by increasing a field current of the vehicle generator, a control for increasing an electric energy generation amount by increasing a drive rotational speed of the engine, a control for reducing the supply of electric energy to a general load irrelevant to traveling of the vehicle and safety of the vehicle, and a control for stopping the supply of electric energy to the general load.

With such a configuration, each time the advance notice is detected, by sequentially increasing controls in order of an idling stop inhibition control, a control for increasing an electric energy generation amount by increasing a field current, a control for increasing an electric energy generation amount by increasing a drive rotational speed of the engine, a control for reducing the supply of electric energy to a general load, and a control for stopping the supply of electric energy to a general load, the electronic control device can ensure electric energy supplied to the important load. Accordingly, it is possible to prevent an operation of the important load from becoming unstable.

According to still another aspect of this embodiment, the energy storage device may be for a four-wheeled automobile, and the control part may be a management device which manages the energy storage device.

In general, when an energy storage device is used for an automobile, the electric energy management system includes a management device which manages the energy storage device and hence, it is possible to issue advance notice to the electric energy control part by the management device. Accordingly, it is unnecessary to additionally provide a control part so that the electric energy management system can be simplified.

Embodiment 1

An embodiment 1 is described with reference to FIG. 1 to FIG. 5.

An electric energy management system 10 of this embodiment is a vehicle-use electric energy management system 10 mounted on a vehicle such as a four-wheeled automobile. As shown in FIG. 1, the electric energy management system 10 includes: a battery device 20; a vehicle generator 50 which is mounted on an engine of the vehicle; a vehicle load 60 which is connected to the battery device 20 and to the vehicle generator 50; an electronic control unit (hereinafter referred to as "ECU") 70 which is connected to the vehicle load 60 and the vehicle generator 50; a vehicle monitoring part 80 which monitors a traveling state of the vehicle; and an alarm display part 90 which performs alarm display. The battery device 20 is one example of an energy storage apparatus. The ECU is one example of an electronic control device.

The vehicle generator 50 is an alternator, for example. The vehicle generator 50 is mounted on the engine not shown in the drawing of the vehicle, and is rotated along with the driving of the engine thus generating electric energy. The vehicle generator 50 is connected to the vehicle load 60 and the battery device 20, and supplies electric energy to the vehicle load 60, the battery device 20 and the like. An electric energy generation amount of the vehicle generator 50 can be increased such that a rotational speed of the vehicle generator 50 is increased by increasing a rotational speed of the engine, or an electric energy generation voltage of the vehicle generator 50 is increased by increasing a field current of a field coil not shown in the drawing.

The vehicle load 60 is operated when electric energy is supplied to the vehicle load 60 from the battery device 20 or the vehicle generator 50. The vehicle load 60 is classified into an important load 61 relevant to traveling of the vehicle and safety of the vehicle and a general load 62 irrelevant to traveling of the vehicle and safety of the vehicle. As the load relating to traveling of the vehicle in the important load 61, for example, an engine starter, a fuel pump control device, an acceleration control device, a brake control device or the like can be named. As the load relating to safety of the vehicle, for example, a power steering, an ABS (Antilock Brake System), a TCS (Traction Control System), an airbag, a headlight, a blinker and the like can be named. The general load 62 is a load for enhancing comfort, for example, an assist control device which assists opening/closing of a door such as a power sliding door and a power window and moving of a power seat or the like, an air conditioner for adjusting a cabin temperature, and an audio device.

The ECU 70 is connected to the engine, the vehicle load 60, the vehicle generator 50 and the like through communication lines. The ECU 70 performs engine control processing for controlling the engine, that is, for controlling a rotational speed of the engine and the like, and electric energy control processing (one example of "electric energy control step") described later.

The vehicle monitoring part 80 is connected to the ECU 70 through a communication line. The vehicle monitoring part 80 is operated in an interlocking manner with a navigation system provided to the vehicle, for example, thus monitoring whether the vehicle is traveling on a general road or a highway. The monitoring results are inputted into the ECU 70 through the communication line. The ECU 70 determines whether a traveling state of the vehicle is a general road traveling or highway traveling based on the monitoring results, and inputs the traveling state of the vehicle into the battery device 20.

The alarm display part 90 is mounted on an instrument panel not shown in the drawing and assembled to a dashboard of the vehicle. The alarm display part 90 is connected to the ECU 70 through a signal line or a communication line. The alarm display part 90 is operated in response to a display instruction from the ECU 70 thus issuing an alarm to a user such as a driver or an operator.

The battery device 20 supplies electric energy to the vehicle load 60. The battery device 20 includes: a secondary battery 21; a current sensor 22; a temperature sensor 23; a voltage sensor 24; a current cutoff part 25; and a battery management unit (hereinafter "BMU") 30. The secondary battery is one example of the energy storage device. The energy storage device is not limited to the secondary battery, and may be a capacitor, for example. The BMU 30 is one example of the management device for the energy storage device.

The secondary battery 21 is formed such that a plurality of (four in this embodiment) lithium ion batteries are connected in series. A negative electrode side of the secondary battery 21 is connected to a negative electrode terminal 20A mounted on a battery case C, and a positive electrode side of the secondary battery 21 is connected to a positive electrode terminal 20B mounted on the battery case C.

The current sensor 22 is connected to an electric energy line PL disposed between the secondary battery 21 and the negative electrode terminal 20A. The current sensor 22 detects an electric current which flows through the electric energy line PL, and outputs a current value corresponding to the detected current.

The temperature sensor 23 is a contact type sensor or a non-contact type sensor. The temperature sensor 23 measures a temperature of the secondary battery 21, and outputs a temperature measurement value corresponding to the measured temperature.

The voltage sensor 24 is connected to both terminal portions of the secondary battery 21. The voltage sensor 24 detects a voltage between terminals of the secondary battery 21, and outputs a voltage value corresponding to the detected voltage.

The current sensor 22, the temperature sensor 23, and the voltage sensor 24 are connected to the BMU 30 through signal lines or communication lines. Outputs from the respective sensors are taken into the BMU 30.

The current cutoff part 25 is a semiconductor switch such as an FET or a relay, for example. The current cutoff part 25 is provided on the electric energy line PL between the secondary battery 21 and the positive electrode terminal 20B. The current cutoff part 25 is operated in response to a drive instruction from the BMU 30, and cuts off an electric current which flows through the electric energy line PL between the secondary battery 21 and the positive electrode terminal 20B.

Figure 2:
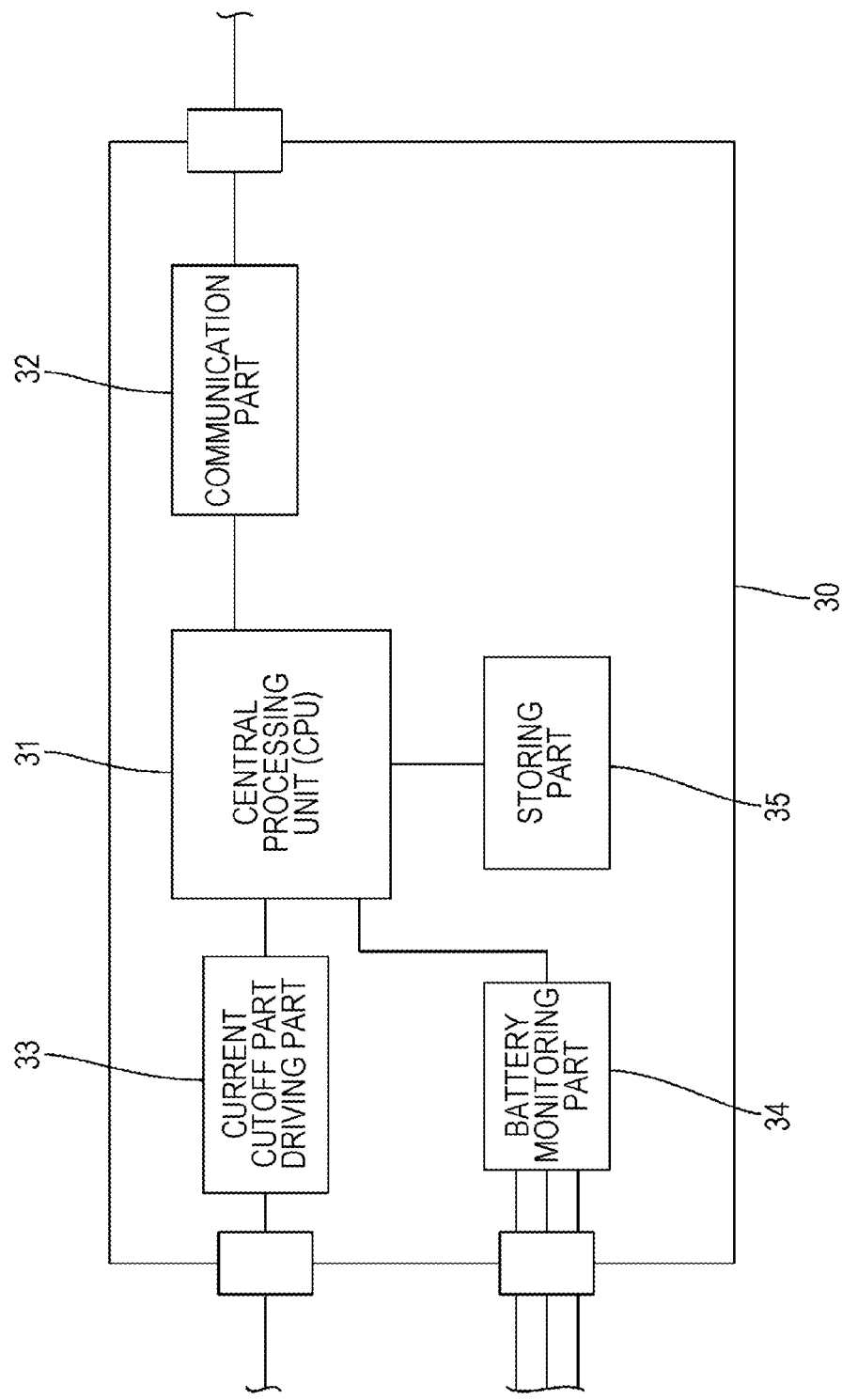
FIG. 2 is a block diagram of a management device.

The BMU 30 is connected to the current cutoff part 25 and a communication connector 20C mounted on the battery case C through signal lines or communication lines. The BMU 30 is connected to the secondary battery 21 so that electric energy is directly supplied to the BMU 30 from the secondary battery 21. As shown in FIG. 2, the BMU 30 includes: a central processing unit (hereinafter referred to as "CPU") 31; a communication part 32; a current cutoff part driving part 33; a battery monitoring part 34; and a storing part 35.

As shown in FIG. 1, the communication connector 20C can be connected to a vehicle-side communication connector 71 provided to the ECU 70 of the vehicle. By connecting the communication connector 20C and the vehicle-side communication connector 71 to each other, the BMU 30 and the ECU 70 are brought into a communicable state.

As shown in FIG. 2, one end of the communication part 32 is connected to the CPU 31, and the other end of the communication part 32 is connected to the communication connector 20C. The communication part 32 performs transmission/reception of signal or data between the CPU 31 and the ECU 70.

The current cutoff part driving part 33 receives cutoff instruction or a release instruction transmitted from the CPU 31, and outputs a driving instruction corresponding to the instruction to the current cutoff part 25.

The battery monitoring part 34 monitors a state of the secondary battery 21 by taking outputs from the respective sensors 22, 23, 24 into the BMU 30 thus detecting an abnormal state of the secondary battery 21. The battery monitoring part 34 outputs the detection results to the CPU 31.

The storing part 35 stores various programs therein for controlling an operation of the BMU 30.

Figure 3:
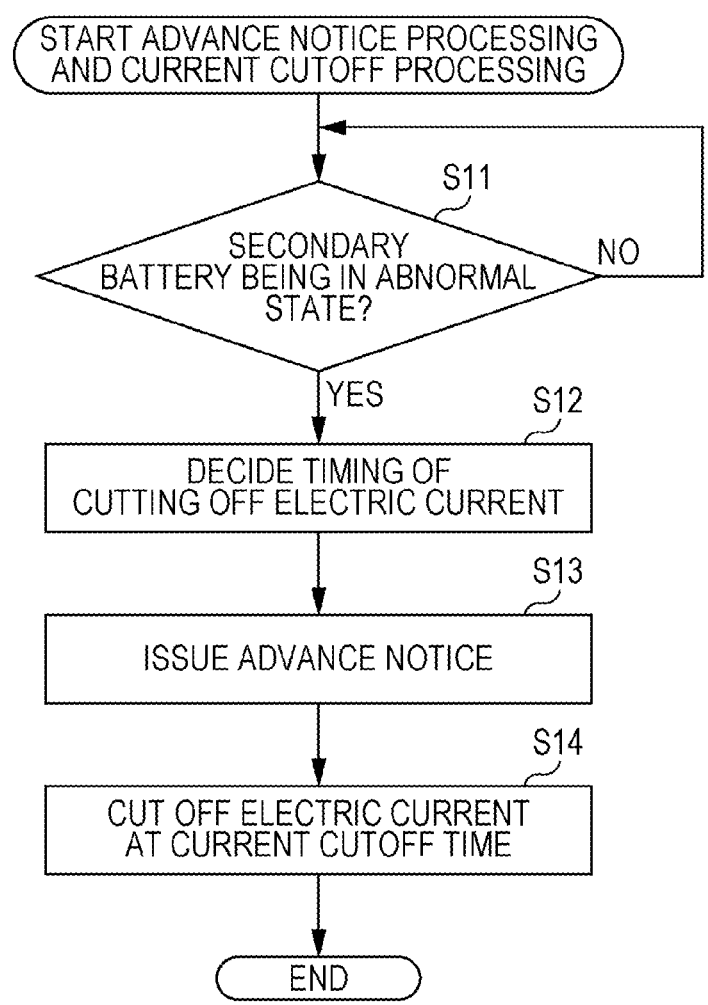
FIG. 3 is a flowchart showing advance notice processing and current cutoff release processing.
Figure 5:
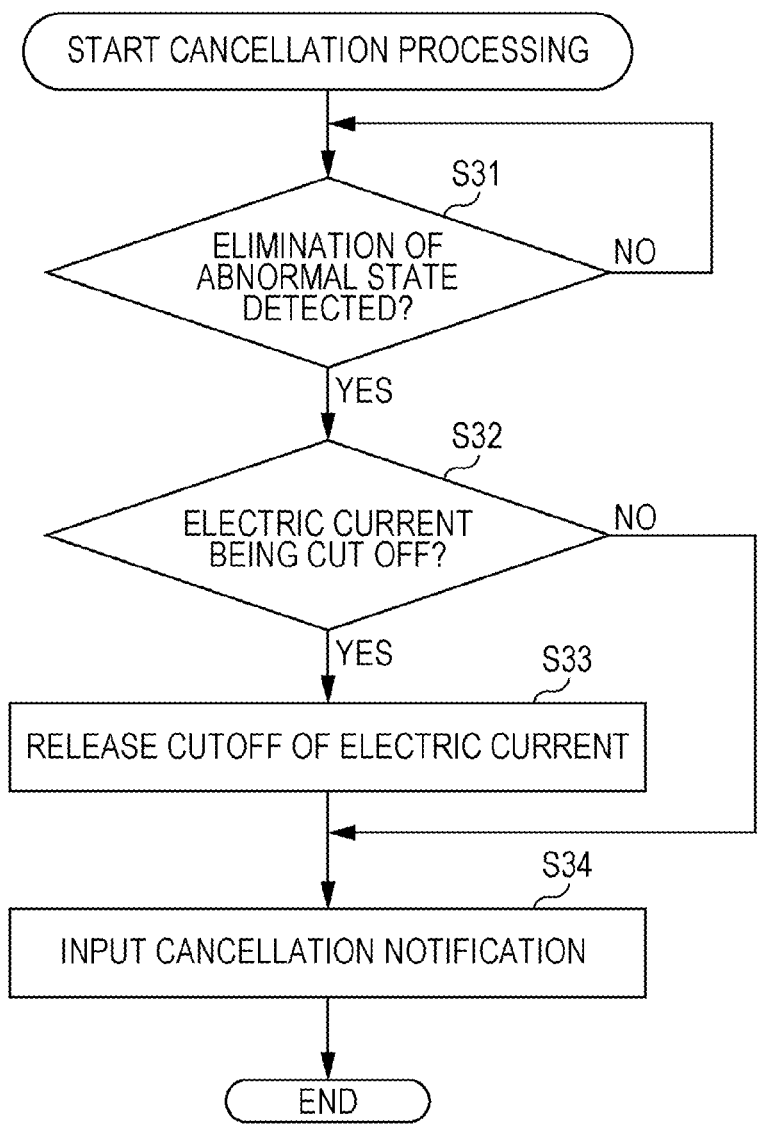
FIG. 5 is a flowchart showing cancellation processing.

The CPU 31 performs monitoring and controls of respective parts such as advance notice processing (one example of "advance notice step") to the ECU 70 shown in FIG. 3 and FIG. 5, current cutoff processing, cancellation processing and the like, based on various received signals and data and a program read out from the storing part 35.

Next, the advance notice processing and the current cutoff processing performed by the BMU 30 are described and, then, electric energy control processing by the ECU 70 is described.

First, the current cutoff processing is briefly described.

The CPU 31 of the BMU 30 determines whether or not there is a possibility that the secondary battery 21 falls into an abnormal state such as an overcharge state, an overdischarge state or an excessive temperature elevation based on a detection result of the battery monitoring part 34. When the CPU 31 determines that there is a possibility that the secondary battery 21 falls into the abnormal state, the CPU 31 inputs a cutoff instruction to the current cutoff part 25 through the current cutoff part driving part 33 so that an electric current of the secondary battery 21 is cut off. With such processing, it is possible to protect the secondary battery 21 by preventing the secondary battery 21 from falling into an overcharge state, an overdischarge state or a degradation state caused by an excessive temperature elevation of the secondary battery 21.

When an electric current is cut off by the current cutoff part 25 in the current cutoff processing to protect the secondary battery 21, the supply of electric energy to the vehicle load 60 is performed only by the vehicle generator 50. Accordingly, when an energy consumption amount of the vehicle load 60 exceeds an electric energy generation amount of the vehicle generator 50, an electric energy generation voltage is lowered so that an operation of the important load 61 relevant to vehicle traveling and safety may become unstable. In view of the above, in this embodiment, the BMU 30 performs advance notice processing after the abnormal state of the secondary battery 21 is detected and before an electric current is cut off by the current cutoff part 25.

Advance notice processing and current cutoff processing are described with reference to FIG. 3 hereinafter.

The CPU 31 monitors a state of the secondary battery 21 based on a detection result of the battery monitoring part 34. When the abnormal state, for example, an overcharge state, an overdischarge state or an excessive temperature elevation occurs in the secondary battery 21, the CPU 31 determines that the secondary battery 21 is in the abnormal state based on a detection result of the battery monitoring part 34 (S11). When the CPU 31 determines that the secondary battery 21 is in the abnormal state, the CPU 31 decides timing of cutting off an electric current (S12), and issues an advance notice of timing of cutting off an electric current to the ECU 70 (S13).

Then, when a time for cutting off an electric current arrives, the CPU 31 instructs the current cutoff part 25 to cut off an electric current (S14).

To be more specific, when the CPU 31 detects that the secondary battery 21 is in the abnormal state based on a detection result of the battery monitoring part 34, the CPU 31 decides a time until an electric current is cut off to 1 minute, for example.

Next, at a point of time that the CPU 31 decides the time until an electric current is cut off, the CPU 31 inputs a message that an electric current is cut off after a lapse of 1 minute to the ECU 70 as the advance notice through the communication part 32. Then, after a lapse of 1 minute from the advance notice, the CPU 31 inputs a cutoff instruction to the current cutoff part 25 through the current cutoff part driving part 33 so that the current cutoff part 25 cuts off an electric current.

Next, electric energy control processing of the ECU 70 to which the advance notice is inputted is described with reference to FIG. 4. In electric energy control processing, a control of the supply of electric energy to the vehicle load 60 from the vehicle generator 50 is performed.

To be more specific, the ECU 70 monitors inputting of an advance notice from the BMU 30 in the battery device 20 (S21). When the ECU 70 detects inputting of the advance notice from the CPU 31 of the BMU 30, the ECU 70 performs the following controls within a time which is informed by the advance notice.

First, the ECU 70 performs an idling stop inhibition control for inhibiting a temporarily stop of idling of the engine (S22) to prevent that the engine is temporarily stopped and electric energy is not supplied to the vehicle load 60 from the vehicle generator 50.

Next, the ECU 70 compares an electric energy generation amount which the vehicle generator 50 generates and an electric energy consumption amount which the vehicle load 60 consumes (S23). When the electric energy consumption amount is larger than the electric energy generation amount, the ECU 70 performs an electric energy generation amount increase control for increasing an electric energy generation amount of the vehicle generator 50 by inputting an instruction of increasing a field current to the vehicle generator 50 (S24).

When the abnormal state of the secondary battery 21 is eliminated after the CPU 31 inputs the advance notice to the ECU 70, it is necessary to return the electric energy management system 10 into a normal state by cancelling electric energy control processing while releasing the cutoff of the supply of an electric current to the secondary battery 21 in the battery device 20. Accordingly, the electric energy management system 10 performs cancellation processing in the CPU 31 and, subsequently, the electric energy management system 10 issues a cancellation notification to the ECU 70.

Cancellation processing performed in the CPU 31 is described hereinafter with reference to FIG. 5.

The CPU 31 continues monitoring of the secondary battery 21 through the battery monitoring part 34 even after advance notice processing is performed. When the abnormal state of the secondary battery 21 is improved, the CPU 31 detects that the abnormal state of the secondary battery 21 is eliminated based on a detection result of the battery monitoring part 34 (S31).

When the CPU 31 detects that the abnormal state of the secondary battery 21 is eliminated based on a detection result of the battery monitoring part 34, the CPU 31 detects whether or not an electric current is cut off in the current cutoff part 25 (S32). When the CPU 31 detects that an electric current is in the midst of the cutoff in the current cutoff part 25, the cutoff of an electric current is released through the current cutoff part driving part 33 (S33).

Then, when an electric energy state is returned to a state where electric energy can be supplied to the vehicle load 60 from the secondary battery 21 of the battery device 20, the CPU 31 inputs a cancellation notification to the ECU 70 (S34).

Figure 4:
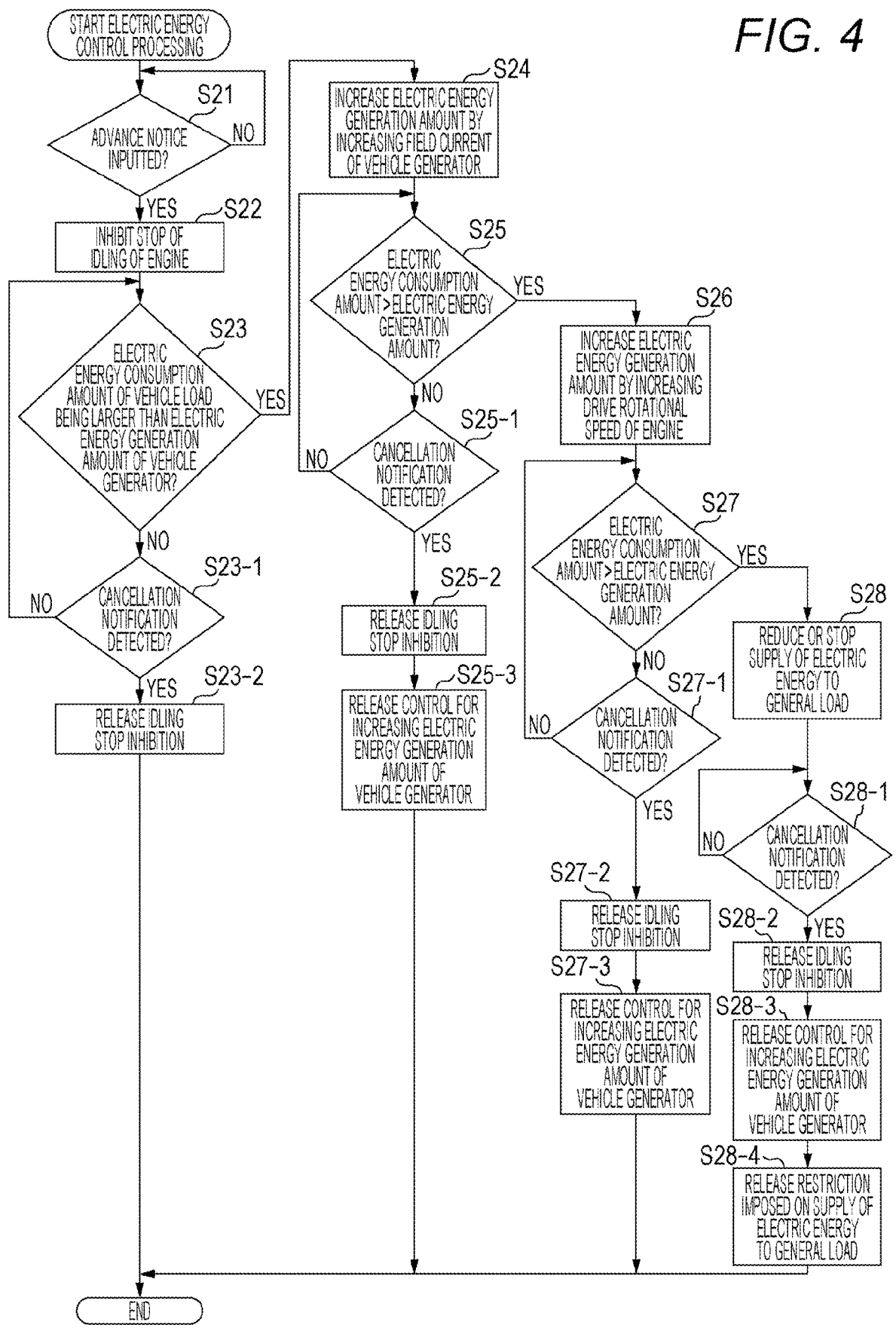
FIG. 4 is a flowchart showing electric energy control processing.

Accordingly, as shown in FIG. 4, the ECU 70 compares an electric energy generation amount which the vehicle generator 50 generates and an electric energy consumption amount which the vehicle load 60 consumes (S23). When the electric energy consumption amount is not larger than the electric energy generation amount, the ECU 70 monitors inputting of a cancellation notification from the BMU 30 (S23-1). When there is no inputting of a cancellation notification, the ECU 70 repeatedly checks at predetermined time intervals whether or not the electric energy consumption amount of the vehicle load 60 becomes larger than the electric energy generation amount of the vehicle generator 50 (S23). Then, when the ECU 70 detects inputting of a cancellation notification from the CPU 31 of the BMU 30, the idling stop inhibition control is released (S23-2).

Then, when an electric energy consumption amount of the vehicle load 60 is larger than an electric energy generation amount of the vehicle generator 50 and the electric energy generation amount is increased along with an increase of a field current in the vehicle generator 50 (S24), the ECU 70 compares again an electric energy generation amount which the vehicle generator 50 generates and an electric energy consumption amount which the vehicle load 60 consumes to each other (S25). When the electric energy consumption amount is not larger than the electric energy generation amount, the ECU 70 monitors inputting of a cancellation notification from the BMU 30 (S25-1). When there is no inputting of a cancellation notification, the ECU 70 repeatedly performs at predetermined time interval a comparison between an electric energy consumption amount of the vehicle load 60 and an electric energy generation amount of the vehicle generator 50 (S25). Then, when the ECU 70 detects inputting of a cancellation notification from the CPU 31 of the BMU 30, the idling stop inhibition control is released (S25-2). The ECU 70 restores the vehicle generator 50 to a normal state or by releasing a control for increasing an electric energy generation amount of the vehicle generator 50 (S25-3).

When the electric energy consumption amount is larger than the electric energy generation amount, the ECU 70 inputs an instruction for increasing a rotational speed of the vehicle generator 50 by increasing a drive rotational speed of the engine to the vehicle generator 50 thus further increasing an electric energy generation amount of the vehicle generator 50 (S26).

Then, at a point of time that an electric energy generation amount is increased in the vehicle generator 50, the ECU 70 compares again an electric energy generation amount which the vehicle generator 50 generates and an electric energy consumption amount which the vehicle load 60 consumes (S27). When the electric energy consumption amount is not larger than the electric energy generation amount, the ECU 70 monitors inputting of a cancellation notification from the BMU 30 (S27-1). When there is no inputting of a cancellation notification, the ECU 70 repeatedly performs at predetermined time interval a comparison between an electric energy consumption amount of the vehicle load 60 and an electric energy generation amount of the vehicle generator 50 (S27). Then, when the ECU 70 detects inputting of a cancellation notification from the CPU 31 of the BMU 30, the idling stop inhibition control is released (S27-2) and a control for increasing an electric energy generation amount of the vehicle generator 50 is released (S27-3).

When the electric energy consumption amount is larger than the electric energy generation amount, the ECU 70 reduces or stops the supply of electric energy to the general loads 62 irrelevant to traveling of the vehicle and safety among the vehicle loads 60 (S28). A control of the supply of electric energy to the vehicle load 60 from the vehicle generator 50 is performed such that the electric energy consumption amount does not become larger than the electric energy generation amount. Then, the ECU 70 monitors inputting of a cancellation notification from the BMU 30 (S28-1). When the ECU 70 detects inputting of a cancellation notification from the CPU 31 of the BMU 30, the idling stop inhibition control is released (S28-2) and a control for increasing an electric energy generation amount of the vehicle generator 50 is released (S28-3). Further, the restriction imposed on the supply of electric energy to the general loads 62 is released (S28-4) so that all vehicle loads 60 are restored.

The BMU 30 of the battery device 20 issues an advance notice to the ECU 70 before an electric current is cut off in the current cutoff part 25 and hence, it is possible to give a time for performing an electric energy control to the ECU 70 before there is no supply of electric energy to the vehicle loads 60 from the secondary battery 21.

The ECU 70 can increase an electric energy generation amount of the vehicle generator 50 or can reduce an electric energy consumption amount of the general loads 62 of the vehicle load 60 after inputting of an advance notice from the BMU 30 and before cutting off of an electric current from the battery device 20. Accordingly, even after an electric current is cut off in the battery device 20, it is possible to prevent an operation of the important load 61 among the vehicle loads 60 from becoming unstable due to lowering of a voltage.

The secondary battery 21 can be separated from the vehicle loads 60 and the vehicle generator 50 by cutting off an electric current in the battery device 20 after a countermeasure is taken so as to prevent an operation of the important load 61 from becoming unstable in the ECU 70. Accordingly, it is possible to protect the secondary battery 21 before the secondary battery 21 cannot be used.

This embodiment has the above-mentioned configuration. The manner of operation and advantageous effects of the electric energy management system 10 are described hereinafter.

In this embodiment, when the BMU 30 of the battery device 20 detects the abnormal state of the secondary battery 21, an advance notice is inputted to the ECU 70 a predetermined time before an electric current is cut off in the current cutoff part 25. Then, the ECU 70 to which the advance notice is inputted, during a period until an electric current is cut off in the current cutoff part 25 of the battery device 20, controls electric energy supplied to the vehicle loads 60 from the vehicle generator 50. Accordingly, even when there is no supply of electric energy from the battery device 20, it is possible to prevent an operation of the important load 61 among the vehicle loads 60 from becoming unstable due to lowering of a voltage.

Also with respect to the secondary battery 21 of the battery device 20, after a lapse of a predetermined time, an electric current is cut off in the current cutoff part 25 so that the secondary battery 21 is brought into a state where the secondary battery 21 is separated from the vehicle loads 60 and the vehicle generator 50. Accordingly, it is possible to prevent that the abnormal state of the secondary battery 21 is worsened so that the secondary battery 21 cannot be used.

In this embodiment, the secondary battery 21 of the battery device 20 is formed of a lithium ion battery. The lithium ion battery, in general, has the BMU 30 for monitoring a state of the battery such as a current value or a voltage value because of characteristics of the battery. Therefore, in this embodiment, an advance notice can be issued to the ECU 70 by making use of the BMU 30 and hence, it is possible to issue an advance notice to the ECU 70 without additionally providing a control part for issuing the advance notice. Accordingly, it is possible to simplify the electric energy management system 10, and to prevent the rise of a manufacturing cost.

In general, unlike a battery device for a two-wheeled vehicle, a battery device for a four-wheeled vehicle is configured to supply electric energy not only for a control of starting an engine and a control of drive members but also for operations of electric components in a vehicle. Accordingly, there is a tendency that an electric energy consumption amount of general loads in a vehicle load is increased. Accordingly, when there is no supply of electric energy to the vehicle load from a battery device, a voltage of the whole vehicle load is lowered so that an operation of the vehicle load may become unstable.

Although the electric energy management system 10 of this embodiment uses a battery device for a four-wheeled vehicle, the electric energy management system 10 can input an advance notice to the ECU 70 and can perform an electric energy control in the ECU 70 before an electric current from the battery device 20 is cut off. Accordingly, the electric energy management system 10 is extremely effective for preventing an operation of the vehicle load 60 from becoming unstable.

Embodiment 2

Figure 6:
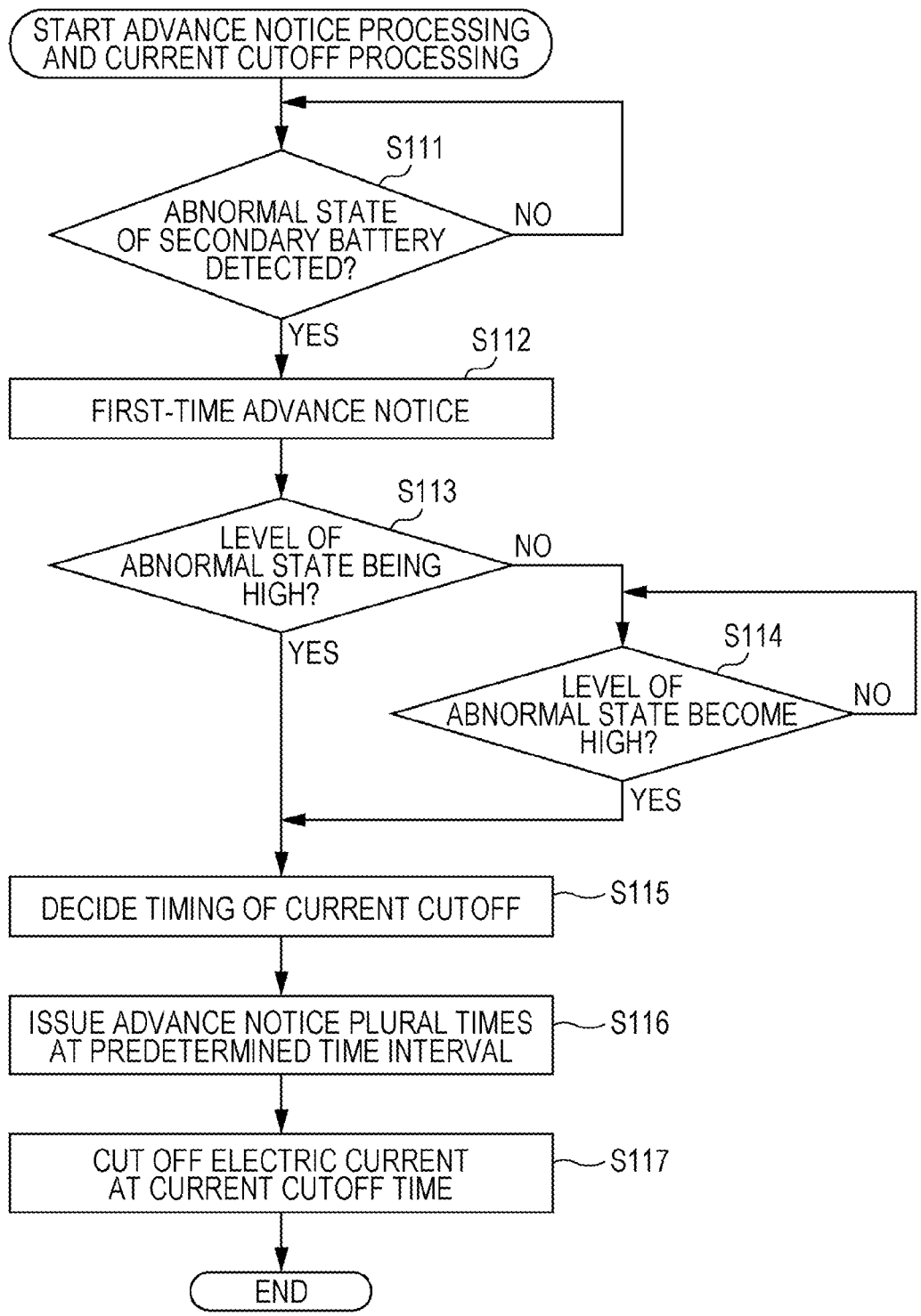
FIG. 6 is a flowchart showing advance notice processing and current cutoff release processing in an embodiment 2.
Figure 7:
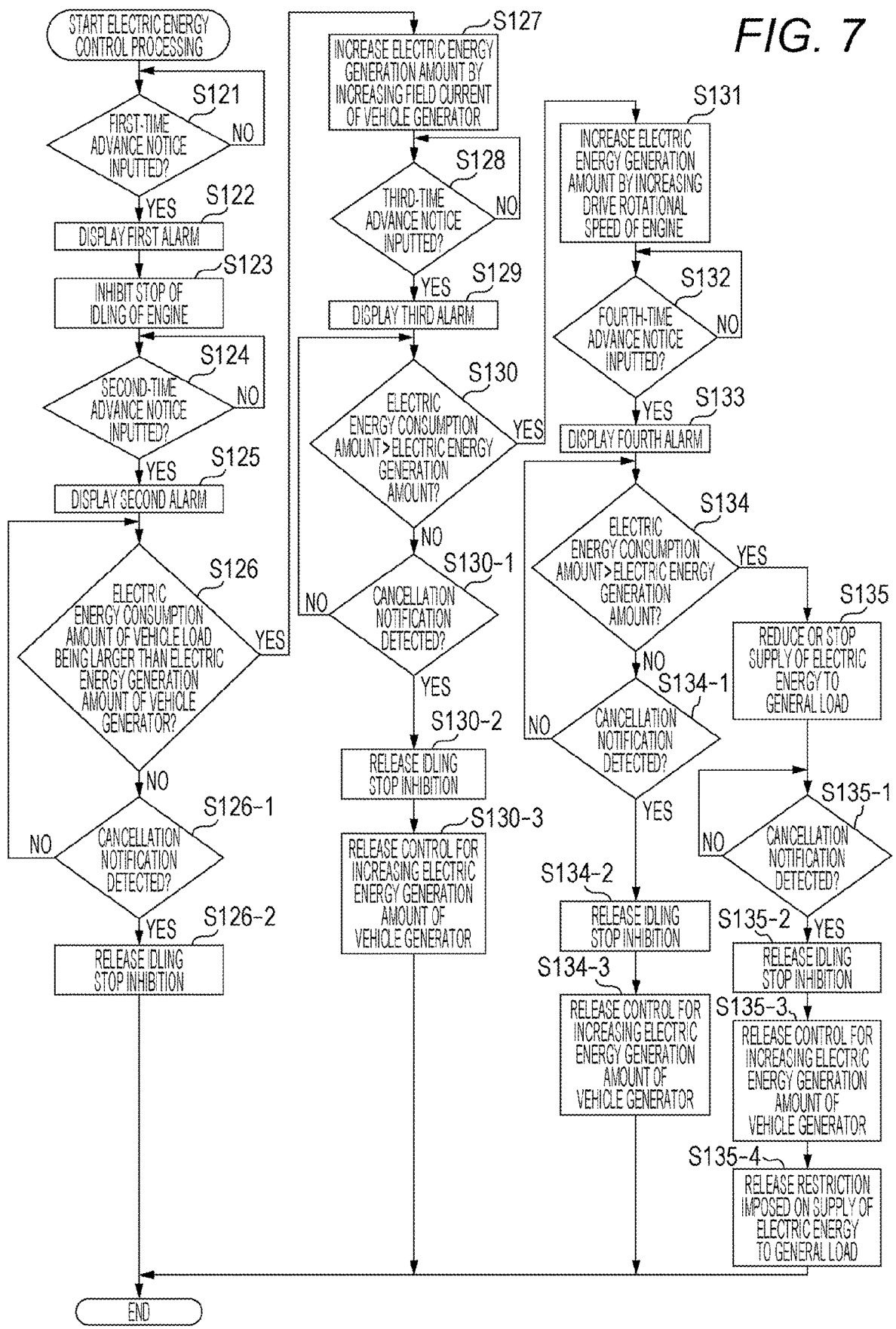
FIG. 7 is a flowchart showing electric energy control processing in the embodiment 2.

Next, the embodiment 2 is described with reference to FIG. 6 and FIG. 7.

The embodiment 2 differs from the embodiment 1 with respect to the content of an advance notice processing and electric energy control processing in the embodiment 1. The descriptions of the configurations, the manner of operation and advantageous effects of the embodiment 2 which overlap with the descriptions of the embodiment 1 are omitted. The same reference symbols are used for constitutional elements in the embodiment 2 identical to the corresponding constitutional elements in the embodiment 1.

First, advance notice processing in the embodiment 2 is described with reference to FIG. 6. In the advance notice processing in this embodiment 2, as shown in FIG. 6, the advance notice processing is performed plural times corresponding to a level of the abnormal state. Processing performed after the abnormal state of the secondary battery 21 is detected differs from the corresponding processing in the embodiment 1.

To be more specific, the CPU 31 determines whether or not there is a possibility that the secondary battery 21 falls into the abnormal state such as an overcharge state, an overdischarge state or an excessive temperature elevation, for example, based on a detection result of the battery monitoring part 34 (S111). When the abnormal state is not detected, the CPU 31 continues monitoring of the secondary battery 21. Also when the CPU 31 detects the abnormal state of the secondary battery 21, the CPU 31 inputs a first-time advance notice to the ECU 70 through the communication part 32 (S112).

Next, the CPU 31 determines a level of the abnormal state based on a detection result of the battery monitoring part 34 (S113). When the CPU 31 determines that the level of the abnormal state is not high, the CPU 31 continues monitoring of the secondary battery 21 until the level of the abnormal state becomes high (S114).

When the CPU 31 determines that a level of the abnormal state is so high that emergency processing is necessary, the CPU 31 decides a timing of current cutoff (S115). To be more specific, when the CPU 31 determines that it is necessary to cut off an electric current based on a detection result of the battery monitoring part 34, the CPU 31 decides a time until an electric current is cut off to 10 minutes, for example.

Next, the CPU 31 issues an advance notice to the ECU 70 plural times at a predetermined time interval with reference to the time until an electric current is cut off (S116). To be more specific, for example, the CPU 31 issues a second-time advance notice to the ECU 70 readily. Next, the CPU 31 performs an advance notice 5 minutes before the current cutoff and 1 minute before the current cutoff. That is, the CPU 31 issues the advance notice four times in total.

Then, when the current cutoff time arrives, the CPU 31 inputs a cutoff instruction to the current cutoff part 25 through the current cutoff part driving part 33 thus cutting off an electric current in the current cutoff part 25 (S117).

Next, electric energy control processing in the embodiment 2 is described with reference to FIG. 7. In electric energy control processing in the embodiment 2, the vehicle generator 50 and the vehicle load 60 are controlled in response to advance notices inputted plural times. The electric energy control processing in the embodiment 2 differs from electric energy control processing in the embodiment 1 with respect to processing after an idling stop inhibition control is performed in the ECU 70.

The ECU 70 monitors inputting of an advance notice from the BMU 30 in the battery device 20 (S121). When a first-time advance notice is inputted to the ECU 70 from the CPU 31 of the battery device 20, the ECU 70 displays a first alarm on an alarm display part 90 (S122), and performs an idling stop inhibition control (S123). Then, the ECU 70 monitors inputting of a second-time advance notice from the BMU 30 (S124).

When the second-time advance notice is inputted to the ECU 70 from the BMU 30, the ECU 70 displays a second alarm on the alarm display part 90 (S125), and the ECU 70 compares an electric energy generation amount which the vehicle generator 50 generates and an electric energy consumption amount which the vehicle load 60 consumes to each other (S126). When the electric energy consumption amount is not larger than the electric energy generation amount, the ECU 70 monitors inputting of a cancellation notification from the BMU 30 (S126-1). When there is no inputting of a cancellation notification, the ECU 70 repeatedly checks at predetermined time intervals whether or not the electric energy consumption amount of the vehicle load 60 becomes larger than the electric energy generation amount of the vehicle generator 50 (S126). Then, when the ECU 70 detects inputting of a cancellation notification from the CPU 31 of the BMU 30, the idling stop inhibition control is released (S126-2).

When the electric energy consumption amount is larger than the electric energy generation amount, the ECU 70 inputs an instruction of increasing a field current to the vehicle generator 50 so as to increase an electric energy generation amount of the vehicle generator 50 (S127). Then, the ECU 70 monitors inputting of a third-time advance notice from the BMU 30 (S128).

Next, when the third-time advance notice is inputted to the ECU 70 from the BMU 30, the ECU 70 displays a third alarm on the alarm display part 90 (S129), and the ECU 70 compares an electric energy generation amount which the vehicle generator 50 generates and an electric energy consumption amount which the vehicle load 60 consumes to each other (S130). The ECU 70 monitors inputting of a cancellation notification from the BMU 30 (S130-1). When there is no inputting of a cancellation notification, the ECU 70 repeatedly performs at predetermined time interval a comparison between an electric energy consumption amount of the vehicle load 60 and an electric energy generation amount of the vehicle generator 50 (S130). Then, when the ECU 70 detects inputting of a cancellation notification from the CPU 31 of the BMU 30, the idling stop inhibition control is released (S130-2). Further, the ECU 70 releases a control for increasing an electric energy generation amount of the vehicle generator 50 (S130-3) thus restoring the vehicle generator 50 to a normal state.

When the electric energy consumption amount is larger than the electric energy generation amount, the ECU 70 increases a rotational speed of the vehicle generator 50 by increasing a drive rotational speed of the engine thus further increasing an electric energy generation amount of the vehicle generator 50 (S131). Then, the ECU 70 monitors inputting of a fourth-time advance notice (S132).

When the fourth-time advance notice is inputted to the ECU 70 from the BMU 30 at last, the ECU 70 displays a final alarm on the alarm display part 90 (S133), and the ECU 70 compares an electric energy generation amount which the vehicle generator 50 generates and an electric energy consumption amount which the vehicle load 60 consumes to each other again (S134). When the electric energy consumption amount is not larger than the electric energy generation amount, the ECU 70 monitors inputting of a cancellation notification from the BMU 30 (S134-1). When there is no inputting of a cancellation notification, the ECU 70 repeatedly performs at predetermined time interval a comparison between the electric energy consumption amount of the vehicle load 60 and the electric energy generation amount of the vehicle generator 50 to each other (S134). Then, when the ECU 70 detects inputting of a cancellation notification from the CPU 31 of the BMU 30, the idling stop inhibition control is released (S134-2) and the control for increasing an electric energy generation amount of the vehicle generator 50 is released (S134-3).

When the electric energy consumption amount is larger than the electric energy generation amount, the ECU 70 reduces or stops the supply of electric energy to the general load 62 of the vehicle load 60 (S135). Then, the ECU 70 monitors inputting of a cancellation notification from the BMU 30 (S135-1). When the ECU 70 detects inputting of a cancellation notification from the CPU 31 of the BMU 30, the idling stop inhibition control is released (S135-2) and a control for increasing an electric energy generation amount of the vehicle generator 50 is released (S135-3). Further, the restriction imposed on the supply of electric energy to the general loads 62 is released (S135-4) so that all vehicle loads 60 are restored.

According to this embodiment, the advance notice is issued with respect to the ECU 70 when the abnormal state is detected and when the level of the abnormal state rises. For example, a first-time advance notice is issued firstly in a stage where the abnormal state is detected, and an advance notice is issued again when the level of the abnormal state is raised. Accordingly, in the ECU 70, an electric energy control can be performed in a stepwise manner corresponding to a level of the abnormal state (the number of times of advance notices).

The ECU 70 advances the preparation of an electric energy control in a stepwise manner based on the advance notices which are inputted from the BMU 30 plural times in a stepwise manner so that the concentration of loads on a vehicle side can be prevented. Further, the ECU 70 advances the preparation of an electric energy control in a stepwise manner and hence, for example, a wasteful use of an electric energy control can be reduced compared to a case where all electric energy controls such as the increase of an electric energy generation amount by the vehicle generator and the restriction imposed on the supply of electric energy to general loads are performed at a time.

Further, even when the abnormal state of the secondary battery 21 is eliminated, it is sufficient to restore only a portion to which an electric energy control is performed and hence, the electric energy management system 10 can be readily restored into a normal state. Further, an alarm is displayed on the alarm display part 90 to a user each time an advance notice is inputted to the ECU 70 from the BMU 30 and hence, when a vehicle can stop, the user stops the vehicle so that the battery device 20 can be protected.

Embodiment 3

Next, the embodiment 3 is described with reference to FIG. 8.

The embodiment 3 differs from the embodiment 1 with respect to the content of an advance notice processing and electric energy control processing in the embodiment 1. The descriptions of the configurations, the manner of operation and advantageous effects of the embodiment 3 which overlap with the description of the embodiment 1 are omitted. The same reference symbols are sued for constitutional elements in the embodiment 3 identical to the corresponding constitutional elements in the embodiment 1. Further, electric energy control processing in the embodiment 3 has the same configuration as electric energy control processing in the embodiment 2 and hence, the description of electric energy control processing in the embodiment 3 is omitted.

Figure 8:
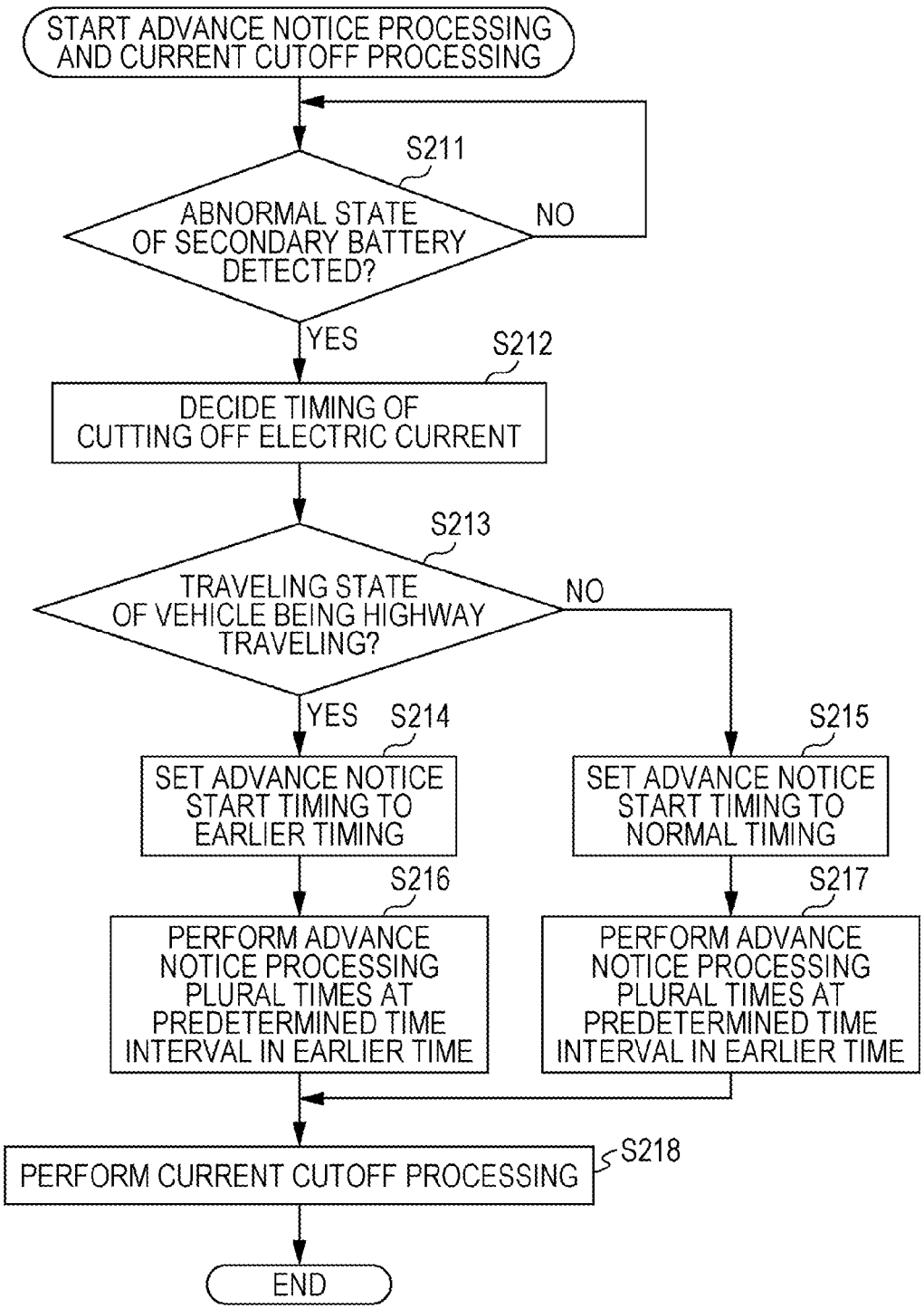
FIG. 8 is a flowchart showing advance notice processing and current cutoff release processing in an embodiment 3.

As shown in FIG. 8, advance notice processing in the embodiment 3 changes a start timing of an advance notice in conformity with a traveling state of a vehicle. Accordingly, the embodiment 3 differs from the embodiment 1 with respect to processing after a timing at which an electric current is cut off is decided.

To be more specific, the CPU 31 determines whether or not there is a possibility that the secondary battery 21 falls into the abnormal state such as an overcharge state, an overdischarge state or an excessive temperature elevation, for example, based on a detection result of the battery monitoring part 34 (S211). When the abnormal state is not detected, the CPU 31 continues monitoring of the secondary battery 21. When the CPU 31 detects the abnormal state of the secondary battery 21, the CPU 31 decides a timing at which an electric current is cut off (S212). To be more specific, the timing at which an electric current is cut off is decided to 30 minutes after the abnormal state is detected.

Next, the CPU 31 determines a timing of an advance notice based on a traveling state of a vehicle inputted in advance from the ECU 70 of the vehicle (S213). As a result of the determination of the CPU 31, the CPU 31 sets an advance notice start timing to an earlier timing when a traveling state is a highway traveling (S214), and sets the advance notice start timing to a normal timing when the traveling state is a general road traveling (S215).

To be more specific, for example, when a vehicle travels on a highway, there is a possibility that the vehicle cannot stop readily. Accordingly, for example, the CPU 31 sets a start timing of an advance notice such that the advance notice readily starts, and the advance notice is issued to the ECU 70 plural times at a predetermined time interval in the earlier timing (S216). To be more specific, for example, the CPU 31 issues a second-time advance notice to the ECU 70 readily. Next, the CPU 31 performs an advance notice 20 minutes before the current cutoff and 10 minutes before the current cutoff. That is, the CPU 31 issues the advance notice plural times.

When the vehicle travels on a general road, it is considered that the vehicle can readily stop and hence, a start timing of an advance notice is set to 10 minutes before starting a current cutoff. The CPU 31 issues an advance notice to the ECU 70 plural times at a usual predetermined time interval until a point of time that an electric current is cut off (S217).

When the current cutoff time arrives, the CPU 31 inputs a cutoff instruction to the current cutoff part 25 through the current cutoff part driving part 33 thus cutting off an electric current in the current cutoff part 25 (S218).

According to this embodiment, when a vehicle cannot stop suddenly depending on a traveling state of the vehicle, it is possible to alarm a user earlier so that the user can cope with such a situation with tolerance. Further, the ECU 70 can also perform an electric energy control with tolerance.

Other Embodiments

The techniques disclosed in this specification are not limited to the embodiments described with reference to the above-mentioned description and drawings. The following various modes are also included in the techniques.

(1) The above-mentioned embodiments adopt the configuration where the BMU 30 detects the abnormal state of the secondary battery 21 based on an outputs from the current sensor 22, the temperature sensor 23 and the voltage sensor 24. However, the above-mentioned embodiments are not limited to such a configuration, and may be configured such that various sensors are provided so that the BMU can detect various abnormal states such as a gas generated in the secondary battery or the expansion of the secondary battery.

(2) The above-mentioned embodiments adopt the configuration where the alarm display part 90 is disposed in the cabin, and an alarm is displayed on the alarm display part 90 to a user. However, the above-mentioned embodiments are not limited to such a configuration, and may be configured such that an alarm is issued to a user by a sound, an alarm sound or an alarm lamp.

(3) The above-mentioned embodiments adopt the configuration where the current cutoff part 25 is formed of a semiconductor switch or a relay. However, the above-mentioned embodiments are not limited to such a configuration, and the current cutoff part 25 may be formed of a fuse melted when an overcurrent flows, a protective element such as an SC protector (Self Control Protector) which is melted with an overcurrent or forcibly.

(4) The above-mentioned embodiments adopt the configuration where the BMU 30 of the battery device 20 issues an advance notice so that the ECU 70 performs an electric energy control before an electric current is cut off in the current cutoff part 25. However, the above-mentioned embodiments are not limited to such a configuration, and may be configured such that an electric energy control is performed readily based on detection of cutoff of an electric current so that the secondary battery is protected while preventing an operation of an important load from becoming unstable.

Hereinafter, current cutoff detection processing for detecting that an electric current is cut off is described in detail. The configuration of a battery device of an embodiment described hereinafter is substantially equal to the corresponding configuration of the embodiment 1 and hence, the description of the configuration of the battery device is omitted. With respect to electric energy control processing performed by the ECU 70, "advance notice" in the embodiment 1 is replaced with "current cutoff notification".

First, a unit for detecting the cutoff of an electric current is described prior to the description of current cutoff detection processing.

In general, a vehicle generator such as an alternator is rotated in an interlocking manner with drive rotation of an engine and generates electric energy. Accordingly, an electric current which is generated using such rotation is an AC current. The vehicle generator supplies electric energy after converting an AC current to a DC current.

Accordingly, in electric energy supplied from the vehicle generator, even when an electric current is converted to a DC current from an AC current, periodical voltage fluctuation such as pulsation, that is, a so-called ripple voltage is generated.

With respect to this ripple voltage, the inventors of the present invention have found that when a battery device is connected to a power source circuit to which the vehicle generator is connected, the battery device absorbs a ripple voltage, while when an electric current is cut off in the battery device, a ripple voltage is not absorbed by the battery device so that a voltage fluctuation becomes conspicuous.

In view of the above, in an embodiment described hereinafter, the inventor of the present invention have found that the voltage fluctuation in the power source circuit is detected by the voltage sensor 24 so that the cutoff of an electric current can be detected in the current cutoff part 25, and an electric energy control is performed based on a detection result.

Figure 9:
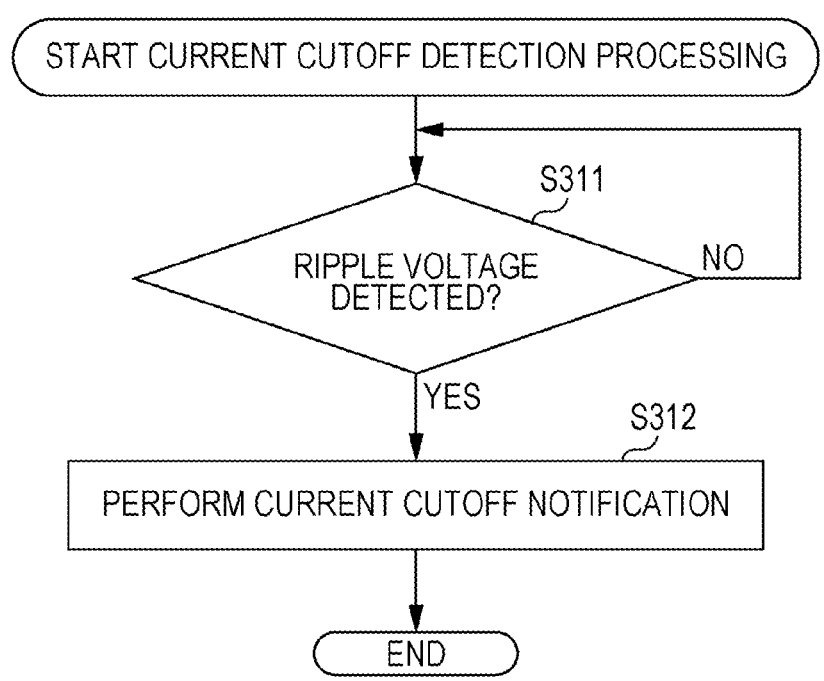
FIG. 9 is a flowchart showing current cutoff detection processing in another embodiment.

Next, current cutoff detection processing is described with reference to FIG. 9.

In the current cutoff detection processing, the CPU 31 monitors a detection result based on a voltage value inputted to the battery monitoring part 34 from the voltage sensor 24 (S311). Then, when a ripple voltage is detected by the voltage sensor 24, the CPU 31 determines that an electric current is cut off in the power source cutoff part, and performs a current cutoff notification to the ECU 70 (S312).

As has been described above, by detecting that an electric current is cut off by current cutoff detection processing which detects the cutoff of an electric current, an electric energy control can be readily performed. Further, the secondary battery 21 can be protected while preventing an operation of an important load 61 from becoming unstable.

Even when an electric current of the secondary battery 21 is cut off unintentionally such as a case where a defect occurs in the current cutoff part 25 or a case where an electric energy line PL is cut off, for example, the CPU 31 issues a current cutoff notification to the ECU 70 and hence, it is possible to prevent an operation of the important loads 61 from becoming unstable.

(5) In the above-mentioned embodiment, the secondary battery 21 is formed of lithium ion batteries connected in series. However, the secondary battery 21 is not limited to such a configuration, and it is possible to use a battery provided with a battery management device (for example, lead-acid battery, nickel-cadmium rechargeable battery, nickel-metal hydride rechargeable battery or the like).

What is claimed is:

1. An electric energy management system, comprising:
   an energy storage device;
   a generator connected to the energy storage device;
   a load which is connected to the energy storage device and to the generator and is operated with a supply of an electric energy from the energy storage device and the generator;
   an electric energy control part configured to control the supply of the electric energy to the load from the generator;
   a detection part configured to detect an abnormal state of the energy storage device;
   a current cutoff part configured to cut off an electric current between the energy storage device and the load in response to the abnormal state being detected by the detection part; and
   a control part configured to issue an advance notice, notifying of an imminent cut off of the electric current, to the electric energy control part after the abnormal state is detected by the detection part and before the electric current is cut off by the current cutoff part,
   wherein the electric energy control part is configured to control the supply of the electric energy to the load from the generator based on the advance notice,
   wherein the control part is configured to issue the advance notice plural times corresponding to a level of the abnormal state detected by the detection part,
   wherein the generator includes a vehicle generator which is operated along with driving of an engine of a vehicle, and
   wherein the electric energy control part is configured to sequentially perform additional control of the vehicle engine or vehicle generator to control the supply of the electric energy to the load each of the plural times the advance notice is issued.

2. The electric energy management system according to claim 1, wherein the control part is configured to issue the advance notice the plural times at a predetermined time interval to the electric energy control part when the abnormal state is detected by the detection part.

3. The electric energy management system according to claim 1, wherein the control part is configured to issue a cancellation notification for cancelling cutoff of the electric current to the electric energy control part when elimination of the abnormal state is detected by the detection part after the advance notice is issued, and
   wherein the electric energy control part is configured to cancel the control of the supply of electric energy performed based on the advance notice in response to the cancellation notification.

4. The electric energy management system according to claim 1, wherein the electric energy management system is mounted on the vehicle, and includes a vehicle monitoring part configured to monitor a traveling state of the vehicle, and
   wherein the control part is configured to decide a time interval between a timing when an electric current is cut off and a timing when the advance notice is issued corresponding to the traveling state of the vehicle detected by the vehicle monitoring part.

5. The electric energy management system according to claim 1, wherein the electric energy management system is mounted on the vehicle,
   wherein the electric energy control part includes an electronic control device mounted in the vehicle,
   wherein the vehicle includes an alarm issuing part which issues an alarm, and
   wherein the electronic control device is configured to cause the alarm issuing part to issue an alarm in response to the advance notice from the control part.

6. The electric energy management system according to claim 1, wherein the electric energy management system is mounted on the vehicle,
   wherein the electric energy control part includes an electronic control device mounted in the vehicle, and
   wherein the electronic control device is configured to inhibit, when the advance notice is issued, idling stop where idling of the engine is temporarily stopped.

7. The electric energy management system according to claim 1, wherein the electric energy management system is mounted on the vehicle,
   wherein the electric energy control part is configured to increase an electric energy generation amount of the vehicle generator by increasing a field current of the vehicle generator or by increasing a drive rotational speed of the engine when the advance notice is issued.

8. The electric energy management system according to claim 1, wherein the electric energy management system is mounted on the vehicle,
   wherein the load is classified into an important load having a higher degree of importance relevant to at least one of traveling of a vehicle and safety of the vehicle and a general load having a lower degree of importance irrelevant to the traveling of the vehicle or the safety of the vehicle, and
   wherein the electric energy control part is configured to reduce or stop the supply of the electric energy to the general load when the advance notice is issued.

9. The electric energy management system according to claim 1, wherein the electric energy management system is mounted on the vehicle, wherein the electric energy control part includes an electronic control device mounted on the vehicle, wherein the control part is configured to issue the advance notice the plural times at a predetermined time interval to the electric energy control part when the abnormal state is detected by the detection part, and wherein the electronic control device is configured to sequentially increase controls each of the plural times the advance notice is detected in order of an idling stop inhibition control, a control for increasing an electric energy generation amount by increasing a field current of the vehicle generator, a control for increasing an electric energy generation amount by increasing a drive rotational speed of the engine, a control for reducing the supply of the electric energy to a general load irrelevant to traveling of the vehicle and safety of the vehicle, and a control for stopping the supply of the electric energy to the general load.

10. The electric energy management system according to claim 1, wherein the energy storage device is for starting an engine mounted on a four-wheeled automobile, and wherein the control part comprises a management device for the energy storage device which manages the energy storage device.

11. The electric energy management system according to claim 1, wherein the advance notice is issued the plural times after the abnormal state is detected by the detection part and before the electric current is cut off by the current cutoff part.

12. The electric energy management system according to claim 1, wherein the current cutoff part comprises a semiconductor switch.

13. The electric energy management system according to claim 1, wherein the electric energy control part is configured to sequentially increase controls each of the plural times the advance notice is detected in order of an idling stop inhibition control, a control for increasing an electric energy generation amount by increasing a field current of the generator of the vehicle, a control for increasing an electric energy generation amount by increasing a drive rotational speed of the engine of the vehicle, a control for reducing the supply of the electric energy to a general load irrelevant to traveling of the vehicle and safety of the vehicle, and a control for stopping the supply of the electric energy to the general load.

14. A management device for an energy storage device, the management device comprising:

a detection part configured to detect an abnormal state of the energy storage device; and a control part configured to switch an electric current which flows between the energy storage device and a load connected to the energy storage device into a cutoff state when the abnormal state is detected by the detection part, wherein the control part is configured to issue an advance notice, notifying of an imminent cut off of the electric current, to an electric energy control part which controls a supply of an electric energy to the load from a generator after the abnormal state is detected by the detection part and before the electric current is switched into the cutoff state, wherein the control part is configured to issue the advance notice plural times corresponding to a level of the abnormal state detected by the detection part, wherein the generator includes a vehicle generator which is operated along with driving of an engine of a vehicle, and wherein the electric energy control part is configured to sequentially perform additional control of the vehicle engine or vehicle generator to control the supply of the electric energy to the load each of the plural times the advance notice is issued.

15. An energy storage apparatus mounted on a vehicle, the energy storage apparatus comprising:

an energy storage device;

the management device for the energy storage device according to claim 13; and a current cutoff part configured to cut off an electric current which flows between the energy storage device and the load, wherein the control part is configured to switch the electric current into a cutoff state by the current cutoff part.

16. The management device according to claim 14, wherein the electric energy control part is configured to sequentially increase controls each of the plural times the advance notice is detected in order of an idling stop inhibition control, a control for increasing an electric energy generation amount by increasing a field current of the generator of the vehicle, a control for increasing an electric energy generation amount by increasing a drive rotational speed of the engine of the vehicle, a control for reducing the supply of the electric energy to a general load irrelevant to traveling of the vehicle and safety of the vehicle, and a control for stopping the supply of the electric energy to the general load.

17. An electric energy management method for a vehicle, wherein the method comprises:

cutting off an electric current which flows between a load mounted on the vehicle and an energy storage device when an abnormal state of the energy storage device is detected;

issuing an advance notice, notifying of an imminent cut off of the electric current, after the abnormal state is detected and before the electric current is cut off; and controlling a supply of an electric energy to the load from a generator mounted on the vehicle based on the advance notice, wherein the advance notice is issued plural times corresponding to a level of the abnormal state detected, wherein the generator is operated along with driving of an engine of the vehicle, and wherein controlling the supply of the electric energy comprises sequentially performing additional control of the vehicle engine or vehicle generator to control the supply of the electric energy to the load each of the plural times the advance notice is issued.

* * * * *